United States Patent [19]

Balk, deceased et al.

[11] 4,381,334
[45] Apr. 26, 1983

[54] ZINC-RICH POWDERS

[75] Inventors: Leizer Balk, deceased, late of Pittsburgh, Pa., by Lois Balk, executrix; James S. Sojkowski, Pittsburgh, Pa.

[73] Assignee: Pratt & Lambert, Inc., Buffalo, N.Y.

[21] Appl. No.: 283,917

[22] Filed: Jul. 16, 1981

Related U.S. Application Data

[63] Continuation of Ser. No. 154,462, May 29, 1980, abandoned, which is a continuation of Ser. No. 740,731, Nov. 10, 1976, abandoned.

[51] Int. Cl.$^3$ .................. B32B 15/08; B32B 27/38; C04B 9/02
[52] U.S. Cl. .................. 428/332; 106/1.17; 106/14.14; 428/334; 428/335; 428/339; 428/402; 428/403; 428/407; 428/413; 428/418; 428/457; 428/551
[58] Field of Search ............. 428/402, 403, 407, 418, 428/460, 524, 551, 327, 332, 334, 335, 339, 413; 427/180, 185, 372, 383; 106/1, 1.17, 14.14; 260/37 R, 37 EP, 37 M, 31.8 R

[56] References Cited

U.S. PATENT DOCUMENTS

| | | | |
|---|---|---|---|
| 3,170,890 | 2/1965 | Boyd et al. | 260/37 EP |
| 3,336,251 | 8/1967 | Manasia | 260/37 EP |
| 3,635,875 | 1/1972 | Reither et al. | 260/37 EP |
| 3,770,482 | 11/1973 | Millar | 428/323 X |
| 3,944,712 | 3/1976 | Kurcz | 428/418 |
| 3,998,771 | 12/1976 | Feneis et al. | 260/37 EP |

*Primary Examiner*—Thomas J. Herbert, Jr.
*Attorney, Agent, or Firm*—Christel, Bean & Linihan

[57] ABSTRACT

A zinc-rich electrostatic powder is prepared comprising zinc incorporated homogeneously in an epoxy resin powder.

11 Claims, No Drawings

ZINC-RICH POWDERS

This is a continuation of application Ser. No. 154,462 filed May 29, 1980, now abandoned which is a continuation of Ser. No. 740,731 filed Nov. 10, 1976 now abandoned.

Zinc-rich electrostatic powders are employed as coatings to protect iron or steel parts from corrosion. The zinc in the coating acts as a sacrificial metal to protect the iron base.

Coatings of this general type are known and even zinc-containing electrostatic powders are known. Millar U.S. Pat. No. 3,770,482 describes one such heterogeneous powder. Millar employs a two layer system. Millar employs up to 30% of zinc, col. 5, lines 13–40.

It is also known to make a free flowing powder for fusion coating of metals including steel employing a mixture of (A) an epoxide resin, a siloxane resin, and a polycarboxylic acid anhydride and (B) a filler, Boyd U.S. Pat. No. 3,170,890. Component (B) can be 25 to 70% of the total of (A) and (B), col. 3, lines 40-55 and the claims. Boyd mentions zinc as a filler on col. 3, line 55. He makes a heterogeneous mixture of the powder which can then be applied to the metal substrate by conventional procedures, e.g., fluidized bed techniques.

Manasia U.S. Pat. No. 3,336,251 shows employing zinc dust as a filler for an epoxy resin in an amount of 1 up to 150 parts per 100 parts of the resin. Manasia simply dry blends his mixture and applies his mixture to a metal substrate, e.g., steel by a fluidized bed procedure.

Caramanian U.S. Pat. No. 3,939,020 discloses applying a coating containing an epoxy resin, powdered zinc, inorganic fibers and barium sulfate to a rotor, e.g., col. 1, lines 42–46.

Kenyon patent 3,518,221 discloses a molding composition comprising an inorganic fiber enveloped in a first epoxy resin and a second epoxy resin surrounding the enveloped fiber, e.g., claim 6. Powdery fillers can also be used, col. 9, lines 23–26.

It has now been found that homogeneous zinc-rich powders, e.g., electrostatic powders, can be prepared by incorporating zinc powder into an epoxy resin melt and thereby, the zinc is uniformly distributed without any density gradient in the finished free-flowing powder.

The zinc powder can be blended with molten epoxy resin in a conventional manner in a screw fed melt compounder followed by cooling and grinding the solid to form a powder compound or else the zinc powder and epoxy resin in powder form can be mixed and the preblended powder homogenized on a heated two-roll mill, at a temperature sufficient to soften or melt the resin, but insufficient to cure it during its working time on the mill. Thus a temperature of 180° F. can be used with epoxy resins that soften below this temperature. Alternatively, the epoxy resin in powder, lump or flake form is added to the heated two roll mill and after it is in softened or molten form, the zinc powder is added and milling continued until a homogeneous blend is obtained. After removal of the homogeneous blend obtained in either of the two milling procedures just described, the product is allowed to cool to solid form and ground to a powder.

Normally the curing aid is added to the epoxy resin prior to mixing with the zinc powder whether the mixing is accomplished by using a screw fed melt compounder or by using hot rolls. In this manner there is obtained a high weight % of zinc powder homogeneously blended with epoxy resin powder. The zinc is 75 to 90% of the total weight of the composition. As stated, after incorporation of the zinc in the molten resin or after milling the product is cooled to form a solid which is then ground to a powder. The exact size of the powder is not particularly critical, but it is usually small enough to pass 100 mesh (Tyler sieve series). For fluid bed application to the metal substrate, e.g., iron or steel, the composition is ground to pass 60 mesh or to pass 200 mesh for spray or electrostatic fluid bed application.

Any of the conventional solid epoxy resins or mixtures of two or more such epoxy resins can be used. There can also be used any of the conventional curing agents for the epoxy resin. Thus, there can be used, for example, as curing agents dicyandiamide, P-108 (a mixture of an imidazole and dicyandiamide having a melting point range of 40°–200° C.), solid cyclic carboxylic acid anhydrides, e.g., trimellitic anhydride, phthalic anhydride, cyclopentane dianhydride, tetrachlorophthalic anhydride and the like.

Illustrative of suitable epoxy resins are Epirez 522F (a bisphenol A-epichlorhydrin resin with a weight per epoxide (WPE) of 600, Durran's Melting Point of 80° C. and supplied by Celanese), DRH 201 (a linear solid bisphenol A-epichlorhydrin resin having a WPE of about 750, a Durran's Melting Point of 90° C. and supplied by Shell), DRH (an epoxy resin identical with DRH 201, except DRH 203 also contains 5% of Modaflow, a flowaid supplied by Monsanto), DER-667 (a solid bisphenol A-epichlorhydrin resin with a WPE of 1600-2000, a Durran's Melting Point of 115°–130° C. and supplied by Dow), XU-214 (a solid bisphenol A-epichlorhydrin resin with an average WPE of 700 and supplied by Ciba-Geigy), Epon 1001 (bisphenol A-epichlorhydrin resin, WPE 450–550, Durran's Melting Point 65°–74° C. and supplied by Shell). There can be even used a small amount of liquid bisphenol A-epichlorhydrin, e.g., Epon 828, having a WPE of 180–195 and a viscosity of 100–160 poises, supplied by Shell, providing the overall epoxy resin in a solid.

The zinc-rich epoxy hot melt powder compositions of the invention can replace conventional zinc galvanizing/plating finishes for iron or steel and offer true galvanic sacrificial protection.

The compositions of the invention have excellent adhesion to iron and steel and when applied thereto, e.g., by spray or electrostatic fluid bed technique, provide a continuous film coating for iron or steel.

In a series of tests of formulations within the invention, the formulation containing 90% zinc provided the best adhesion to steel and the formulation with 85% zinc had the best visual appearance after the coated steel had been subjected to salt attack.

Unless otherwise indicated all parts and percentages are by weight.

The compositions preferably consist essentially of the zinc dust and epoxy resin. As previously indicated there can, of course, be included a curing agent for the epoxy resin to improve the cured film properties and also a small amount of a flow modifier can be included. Small amounts of silica aerogels can be included, e.g., 0.2% of Cab-O-Sil, a flame hydrated silica.

Examples of suitable formulations are the following:

Example 1

| | |
|---|---|
| DRH-201 | 12.0% |

| -continued | |
|---|---|
| DRH-203 | 3.0% |
| Zinc Dust (finely ground 100% zinc powder) | 85.0% |

| Example 2 | |
|---|---|
| Epirez 522F | 20.0 parts |
| DRH-203 | 5.0 parts |
| Zinc Dust | 75.0 parts |
| P-108 | 1.56 parts |
| | 101.56 parts |

| Examples 3 and 4 | | |
|---|---|---|
| | Example 3 | Example 4 |
| Epirez 522F | 11.22% | 7.48% |
| DRH-203 | 3.00% | 2.00% |
| Zinc Dust | 85.00% | 90.00% |
| P-108 | 0.78% | 0.52% |

| Examples 5, 6 and 7 | | | |
|---|---|---|---|
| | Example 5 | Example 6 | Example 7 |
| DRH-203 | 5.0% | 1.84% | 3.00% |
| Zinc Dust | 75.0% | 75.00% | 85.00% |
| P-108 | 1.3% | — | 0.78% |
| Modified Trimellitic Anhydride Curing Agent | — | 6.42% | — |
| DER-667 | 18.7% | — | — |
| Epirez 522F | — | 16.74% | — |
| XU-214 | — | — | 11.22% |

In tests on steel panels both the compositions of Examples 5 and 7 had good to excellent adhesion to steel and the composition of Example 7 had 0-creepage from the scribe marks and no blistering or rust spotting.

The compositions containing 85% zinc (Example 7) and 90% zinc (Example 4) had better anticorrosive results when applied to the steel than the compositions of Example 5, thus indicating superior sacrificial properties as shown by salt fog exposure at times of 100, 200, 300, 400 and 500 hours.

In the above tests the homogeneous zinc-rich compositions were applied to the steel by the conventional fluidized bed procedure. Coatings of 2 mil, 4 mil, 6 mil, 8 mil, 9.4 mil and 12.0 mil thickness were applied to the steel.

The composition of Example 2 was cured on the steel for 15 minutes at 180° C. and in other tests was cured on the steel for 7 minutes at 210° C. The other compositions containing curing agents were similarly cured at 180° C. for 15 minutes or at 210° C. for 7 minutes. A cure cycle of 15 minutes at 180° C. is preferred. Also it is preferred to form a film build of 4–10 mils of the homogeneous zinc-epoxy composition on the iron or steel, e.g., cold rolled steel strip or steel rods.

What is claimed is:

1. An iron or steel substrate having a continuous sacrificial coating of the product obtained by curing a homogeneous zinc-rich powder composition consisting of zinc powder, a curable epoxy resin powder, a curing agent and a flow modifier, thereon, prepared by a process comprising blending the zinc powder with the epoxy resin, curing agent and flow modifier in molten state until a homogeneous mixture is produced, the zinc being 75%–90% by weight of the total of zinc and epoxy resin, cooling the mixture to solid form and then grinding the solid to a powder form 2. A coated substrate according to claim 1 wherein the epoxy resin is a bisphenol A-epichlorhydrin resin.

3. A coated substrate according to claim 2 wherein the zinc is 85%–90% by weight of the total of zinc and epoxy resin.

4. A coated substrate according to claim 3 wherein the coating has a thickness of 2–12 mils.

5. A coated substrate according to claim 4 wherein the coating has a thickness of 4–10 mils.

6. A homogeneous zinc-rich powder composition consisting essentially of zinc powder, a curable epoxy resin powder, a curing agent and a flow modifier, prepared by a process comprising blending the zinc powder with the epoxy resin, curing agent and flow modifier in molten state until a homogeneous mixture is produced, the zinc being 75%–90% by weight of the total of zinc and epoxy resin, cooling the mixture to solid form and thereafter grinding the solid to a powder form.

7. The zinc-rich composition according to claim 6 wherein the epoxy resin is a bisphenol A-epichlorhydrin resin.

8. The zinc-rich composition according to claim 7 wherein the epoxy resin has a WPE of 450-2000.

9. The zinc-rich composition according to claim 8 wherein the zinc is 85%–90% of the total of zinc and epoxy resin.

10. A homogeneous zinc-rich powder composition consisting essentially of zinc powder, a curable epoxy resin powder, a curing agent and a flow modifier, prepared by a process comprising blending the zinc powder, epoxy resin powder, curing agent and flow modifier by any known conventional means, the zinc being 75%–90% by weight of the total of zinc and epoxy resin, then heating the preblended mixture to a temperature sufficient to melt the resin without curing it, while continuously blending the mixture until a homogeneous product is obtained, cooling the product to a solid form and thereafter grinding the solid to form a powder.

11. A homogeneous zinc-rich powder composition consisting essentially of zinc powder, a curable epoxy resin powder, a curing agent and a flow modifier, prepared by a process comprising heating the epoxy resin powder containing said curing agent and said flow modifier by any known conventional means to a temperature sufficient to melt the resin without curing it, and thereafter adding the zinc powder with continuous blending until a homogeneous product is obtained, the zinc being 75%–90% by weight of the total of zinc and epoxy resin, cooling the product to a solid form and thereafter grinding the solid to form a powder.

* * * * *